G. J. STREETER AND W. O. LILLEMOEN.
AUTOMOBILE SIGNAL.
APPLICATION FILED JUNE 8, 1920.

1,374,964.  Patented Apr. 19, 1921.
3 SHEETS—SHEET 1.

G. J. Streeter.
W. O. Lillemoen.
Inventor

By Lancaster and Allwine
Attorneys

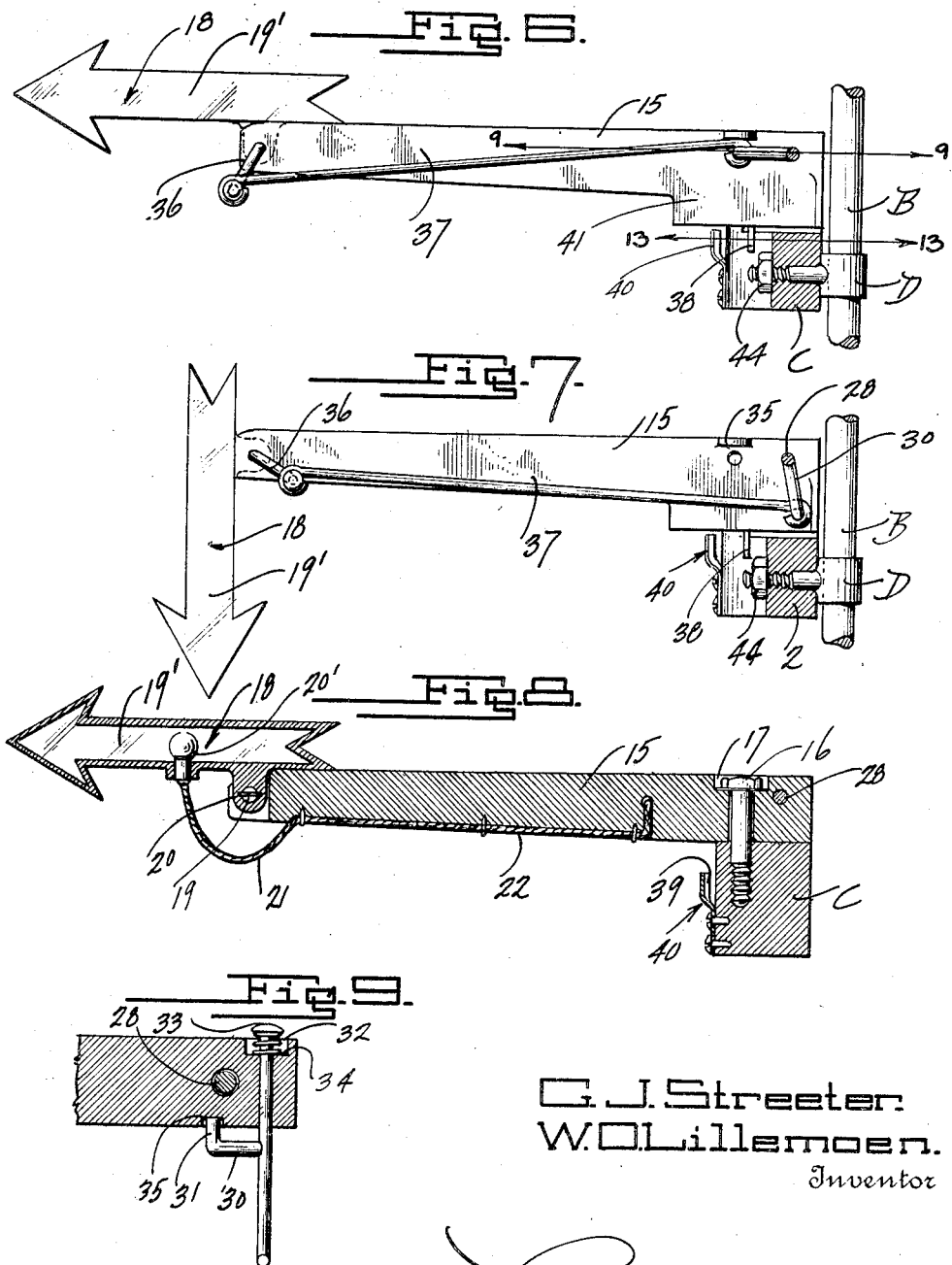

G. J. STREETER AND W. O. LILLEMOEN.
AUTOMOBILE SIGNAL.
APPLICATION FILED JUNE 8, 1920.
1,374,964.
Patented Apr. 19, 1921.
3 SHEETS—SHEET 3.
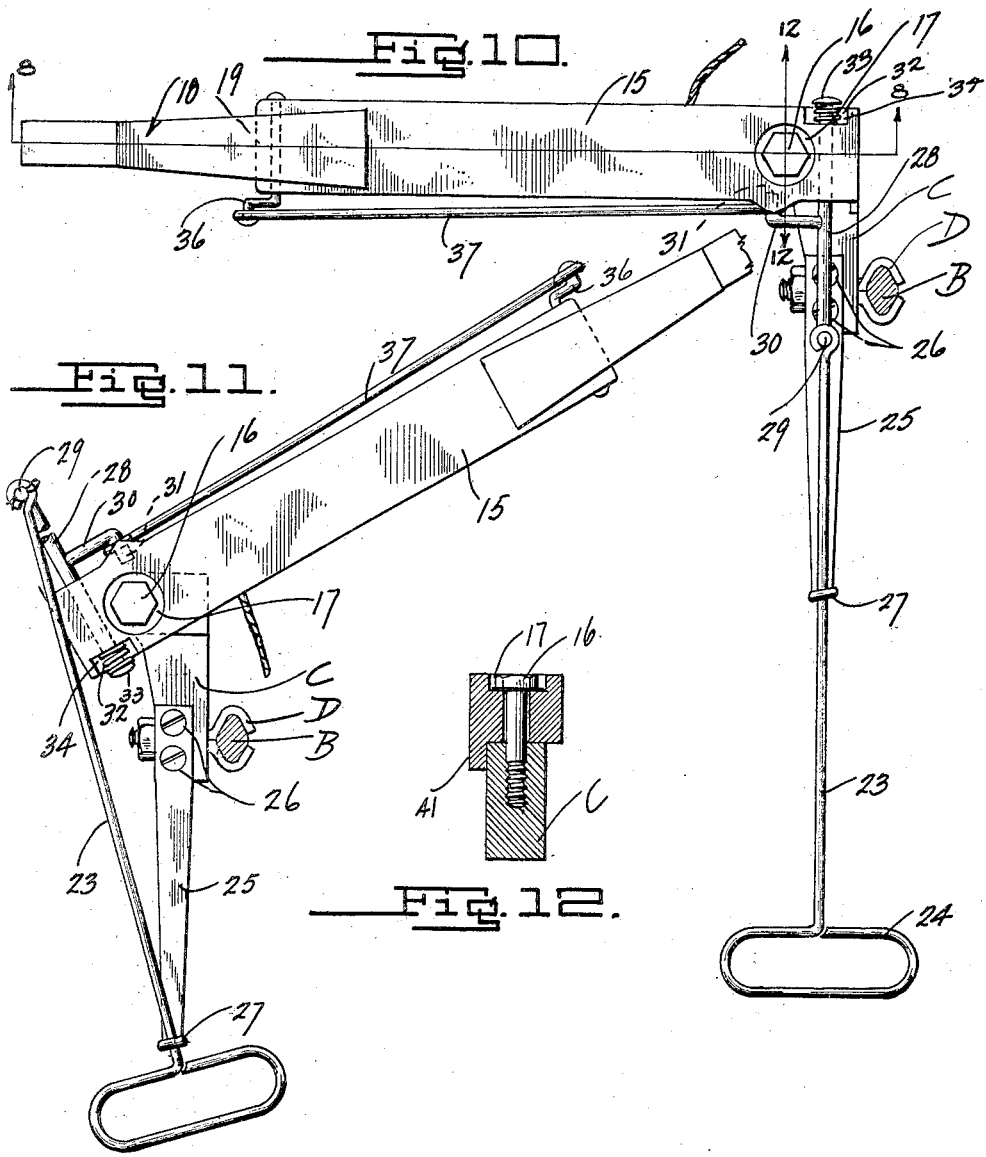
G.J.Streeter.
W.O.Lillemoen.
Inventor
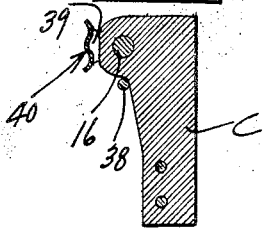
Attorneys

UNITED STATES PATENT OFFICE.

GUY J. STREETER AND WILLIAM O. LILLEMOEN, OF MONROE, WASHINGTON.

AUTOMOBILE-SIGNAL.

1,374,964.    Specification of Letters Patent.    Patented Apr. 19, 1921.

Application filed June 8, 1920. Serial No. 387,422.

*To all whom it may concern:*

Be it known that we, GUY J. STREETER and WILLIAM O. LILLEMOEN, citizens of the United States, residing at Monroe, county of Snohomish, and State of Washington, have invented certain new and useful Improvements in Automobile-Signals, of which the following is a specification.

This invention relates to automobile signals employed in giving an indication of the contemplated movement or parking of the vehicle to which it is attached.

An important object of the invention is the provision of an automobile signal which will be operable by the driver of the vehicle to which it is attached to indicate to traffic in the rear and pedestrains and traffic in the front the contemplated change of movement.

A further object of the invention is to provide a device of the above described character which can be easily attached to the windshield frame, or some other portion of the vehicle in an efficient and substantial manner, with a minimum amount of labor.

Other objects and advantages of the invention will be apparent during the course of the following description.

In the accompanying drawings forming a part of this specification and in which like numerals are employed to designate like parts throughout the same, Figure 1 is a fragmentary perspective view of an automobile to which a signal embodying the invention is attached, showing the signal indicating a contemplated left hand turn.

Fig. 6 is a front elevation partly in section showing the device indicating a turn.

Fig. 7 is a similar view showing the signal indicating a proposed stop.

Fig. 8 is a central longitudinal sectional view through a portion of the device.

Fig. 9 is a fragmentary sectional view taken on the line 9—9 of Fig. 6.

Fig. 10 is a plan view of the signal device showing the indicating arrow in an extended position to the left.

Fig. 11 is a plan view of the signal device as it would be positioned when indicating a right hand turn.

Fig. 12 is a cross sectional view taken on the line 12—12 of Fig. 10.

Fig. 13 is a detail cross-sectional view on the line 13—13 of Fig. 6.

Figure 1:
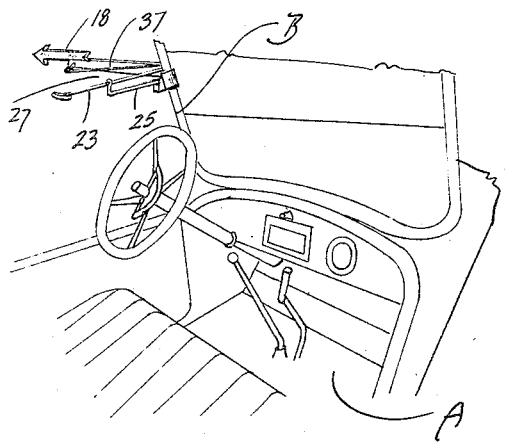
Figure 2:
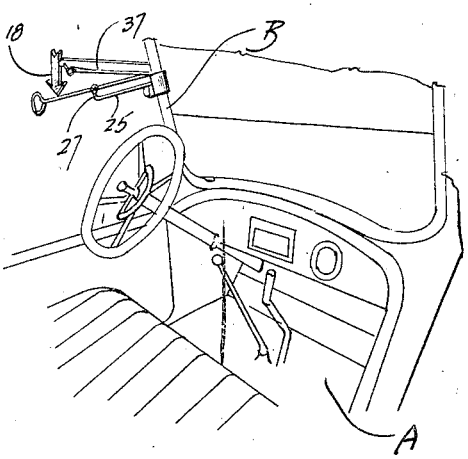
Fig. 2 is a similar view showing the signal when indicating a contemplated stop.
Figure 4:
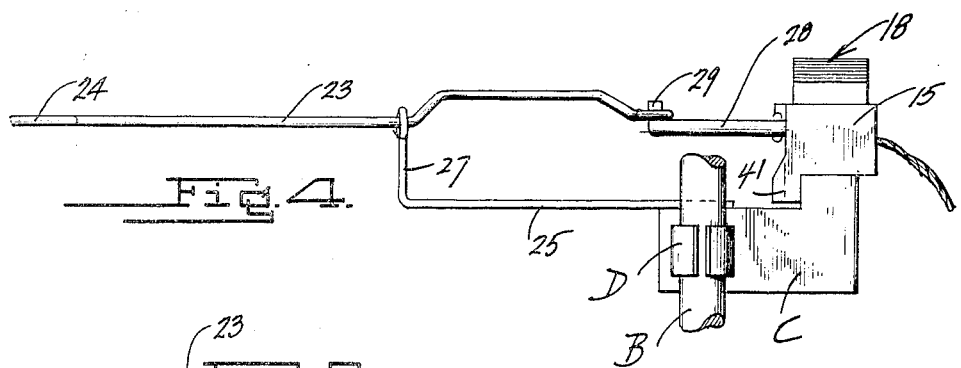
Fig. 4 is a detail side elevation of the signal showing the same clamped to a standard of the vehicle.

In the drawings wherein for the purpose of illustration is shown a preferred embodiment of the invention the letter A designates an automobile or other vehicle to which the signal may be attached, having an upstanding frame B such as a windshield standard to which the supporting base C of the vehicle signal is securely and immovably clamped by a clamping bolt D.

An arm 15 is oscillatingly supported upon the base C to swing in a horizontal plane by means of bolt 16, the head of said bolt being preferably located within a recess 17 in the top of arm 15 so that the top surface of said arm presents no obstruction thereon. Direction indicating means 18 is pivotally supported upon the extremity of the arm 15, by means of a pin 19, the said indicating means being securely fastened to the pin 19 by means of a key or pin 20. The direction indicating means 18 is preferably in the shape of an arrow, this arrow being hollowed or recessed in the shape of an arrow and having on its rear and forward faces red colored lenses 19'. A lamp 20' located within the recessed portion of the arrow 18 furnishes the light which displays the red rays in the shape of the indicating arrow. Feed wires 21 conducting the current to the lamp 20' are preferably located within a recess 22 in the under portion of the arm 15 said wires then extending upwardly and through the said arm to the terminals of a battery (not shown) or to the regular current supply system of the vehicle to which the signal maybe attached, the said lamp being used only during darkness, it being controlled by a switch (not shown) located somewhere on the vehicle.

The signal device is preferably manually operated, the various indicating positions being assumed through manipulation of an operating rod 23, said rod having a handle 24, preferably integral therewith to facilitate operation of the signal. The operating rod 23 is supported by and reciprocable and oscillatable with respect to a bracket 25, the said bracket being affixed to the supporting base C of the signal device by means of screws 26 or the like, the bracket being provided with an upstanding portion 27 which supports the operating rod 23. The arm 15 is provided near its pivoted end with a pin 28 laterally projecting therethrough, said pin provided with an upstanding portion 29, to which the forward end of the operating rod 23 is pivotally attached. The pin 28 is so positioned with respect to the operating rod 23 that lateral and reciprocatory movements of the operating rod will oscillate the arm 15 through an arc of 180° to assume various indicating positions.

The pin 28 has a crank arm 30 extending therefrom and preferably integral therewith, the crank arm being provided with an extending portion 31. A spring 32 bearing against the head 33 of the pin 28 and the bottom of the recess 34 in the arm 15 tends to normally seat the extending portion 31 within a recess 35 of the arm 15, thus preventing rotation of the crank arm 30 when the extension 31 is in its normal position. The pin 19 which pivots the indicating arrow 18 is provided with a crank arm 36 preferably integral therewith and extending beyond a side of the arm 15. A connecting rod 37 pivotally connects the free ends of the crank arms 30 and 36, so that rotation is imparted from one to the other.

Figure 3:
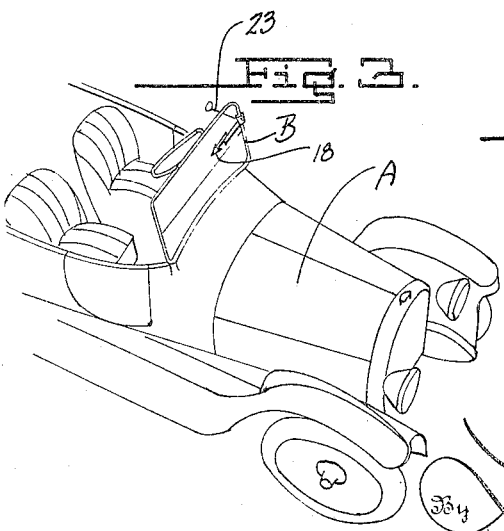
Fig. 3 is a similar view showing the signal when indicating a right hand turn.
Figure 5:
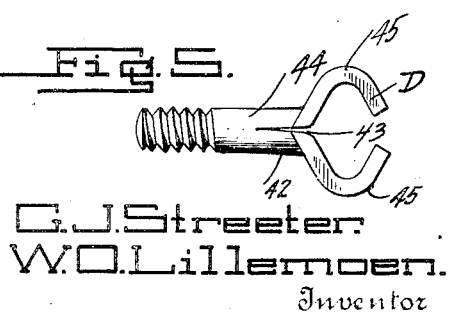
Fig. 5 is a plan view of a clamping bolt.

The normal position of the arm and indicating arrow, when the vehicle is running straight ahead, is with the arm 15 and indicating arrow 18 pointing in the direction of movement of the vehicle. This position is maintained by means of a depending pin 38, which is attached to the lower surface of arm 15, engaging in a recess 39 of a spring clip 40, the spring clip being permanently attached to the case C. From this position if it is desired to go to the right, forward pressure upon the handle 24 will cause the arm 15 and indicating arrow 18 to swing to the right as clearly shown in Figs. 3 and 11 of the drawings. If a left hand turn is desired a pull upon the operating rod 23 will cause the arm and indicating arrow to swing to the left. The right and left extreme limits of movements of the arm 15 are determined by a stop 41 abutting against the rear and forward faces of the base C, the stop 41 being preferably formed integral with the arm 15. If it is desired to signal or indicate a stop to those in front or rear of the machine, the arm 15 is positioned to indicate a left hand turn, a pull is then exerted upon the operating rod 23, this overcomes the tension of the spring 32, causing the pin 28 to move rearwardly enough to withdraw the extending portion 31 of the crank arm 30 from the recess 35 within the arm 15, a torsional movement applied to the operating rod 23 will then cause the indicating arrow to move by means of the crank arms 30 and 36, and the connecting rod 37, to the position shown in Fig. 7 of the drawings. The stop position as illustrated in Fig. 7 of the drawings can also be used when parking the automobile at night, with the indicator illumined.

The clamping bolt D has forwardly tapering sides 42 and is provided with a V slot 43 therein so that upon tightening the nut 44, the jaws 45 of the clamping bolt will be regulated to securely grip the wind-shield standard or some other portion of the vehicle to which the direction indicator might be attached.

It is to be understood that the form of the invention herewith shown and described is to be taken as a preferred example of the same, and that various changes in the shape, size, and arrangement of the parts may be resorted to without departing from the spirit of the invention or the scope of the subjoined claims.

We claim:

1. In an automobile signal, the combination of a supporting base; an arm oscillatively mounted upon said base; an indicating arrow; a pin pivotally connecting said indicating arrow to the arm, said pin provided with a crank arm projecting beyond a side of the arm; a second pin laterally projecting through said arm near the pivot end of the arm, said pin having a crank arm and projecting beyond a side of the arm; a rod connecting said crank arms; an operating rod reciprocatingly mounted on the supporting base; one end of said rod being pivotally connected to the second mentioned pin, to rotate the arrow upon torsional movement of the operating rod.

2. In an automobile signal, the combination of a suppporting base, an arm oscillatively mounted upon said base, an indicating arrow pivotally mounted upon said arm, a pin laterally projecting through said arm, means connecting said pin and said indicating arrow, means normally holding said pin against rotation, and an operating rod reciprocatingly mounted upon the base one end of said rod pivotally engaging the projecting pin to impart a change of direction to the indicating arrow upon torsional movement of the operating rod.

3. In an automobile signal, the combination of a supporting base, an arm oscillatively mounted upon said base, an indicating arrow pivotally mounted upon said arm, a pin laterally projecting through said arm, means connecting said pin and said indicating arrow, means normally holding said pin against rotation, an operating rod reciprocatingly mounted upon the base one end of said rod pivotally engaging the projecting pin to impart a change of direction to the indicating arrow upon torsional movement of the operating rod, and means to hold the indicating means in a neutral position when the automobile is proceeding in a forward direction.

4. A vehicle signal, comprising in combination, a base, an arm supported by said base swingable in a horizontal plane, a pointer supported at the free end portion of said arm, swingable in a vertical plane, and a single means for simultaneously swinging said arm and pointer.

5. A vehicle signal comprising in combination, a base, an arm supported by said base swingable in a horizontal plane, a pointer supported at the free end portion of said arm swingable in a vertical plane, and a single means for independently operating either said arm or said pointer.

6. A vehicle signal comprising in combination, a base, an arm supported by said base and swingable in substantially a horizontal plane, a pointer pivotally supported at the free end portion of said arm and swingable in a substantially vertical plane, an operating rod mounted upon said base, means pivotally connecting said rod to said arm for swinging said arm upon reciprocation of said rod, and means connecting said last mentioned means for operation of said pointer in a vertical plane upon lateral turning of said rod.

GUY J. STREETER.
WILLIAM O. LILLEMOEN.